Feb. 6, 1968

L. S. TERP 3,367,255

CABIN AIR FLOW CONTROL SYSTEM

Filed Feb. 15, 1966

LESLIE S. TERP
INVENTOR.

BY
Herschel C. Omohundro
ATTORNEY

LESLIE S. TERP
INVENTOR.

BY
Herschel C. Omohundro
ATTORNEY

Feb. 6, 1968

L. S. TERP 3,367,255

CABIN AIR FLOW CONTROL SYSTEM

Filed Feb. 15, 1966

LESLIE S. TERP
INVENTOR.

BY
Herschel C. Omohundro
ATTORNEY

United States Patent Office 3,367,255
Patented Feb. 6, 1968

3,367,255
CABIN AIR FLOW CONTROL SYSTEM
Leslie S. Terp, Scottsdale, Ariz., assignor to The Garrett Corporation, Los Angeles, Calif., a corporation of California
Filed Feb. 15, 1966, Ser. No. 527,422
14 Claims. (Cl. 98—1.5)

This invention relates generally to environmental control systems, and is more particularly directed to apparatus and systems for controlling the flow of air under pressure from a plurality of sources thereof to an enclosure, such as an aircraft cabin. Still more particularly, the invention is directed to a system for governing the flow of air from two or more portions of the aircraft engine or engines whereby the most optimum pressures, temperatures, and flow rates will be secured with the unmost efficiency.

One of the primary objects of the invention is to provide a system for controlling the flow of air to an enclosure from a plurality of sources of different pressures, such as high- and low-pressure stages of an aircraft engine, whereby air from the lower pressure source, which obviously is the most economical to produce, will be used to supply the enclosure during the major portion of the mission, air from the higher pressure source being employed only during the periods when the supply from the lower pressure source is insufficient to meet the demands, the higher pressure air being used in a particular manner to augment the flow of air from the lower pressure source.

Another object of the invention is to provide a system for controlling the flow of air to an enclosure from a plurality of sources at different pressures, such system having an ejector means which utilizes air from the higher pressure source to induce a flow of air from the lower pressure source when the pressure therein falls, the system also having valve means and actuating mechanism therefor which is responsive to pressure and flow conditions in selected portions of the system to automatically control the flow from the different sources and secure the most efficiency consistent with the demands.

Still another object of the invention is to provide an air flow control system having a main duct with inlet branches communicating with sources of air under different pressures and an outlet branch leading to an enclosure, the system also having an ejector mechanism at the juncture of the inlet branches and the main duct, valve means for controlling the flow of air from the different sources, and a Venturi section for generating control signals in response to flow therethrough which signals control the operation of the valve means.

A further object of the invention is to provide the system mentioned in the preceding paragraph with fluid pressure responsive actuating means for the flow controlling valve means, and servo-metering type valve means for governing the application of fluid pressure to the actuating means, means for sensing pressure differentials in the main duct at spaced portions of the Venturi section being utilized to provide the signals which control the operation of the servo-metering valve.

A still further object is to provide the systems mentioned in the two preceding paragraphs with means for adjusting predetermined parts of the servo-metering valve means to compensate for variations in either or both pressure and temperature of the air flowing through the main duct whereby a predetermined weight flow of air through the main duct to the cabin will be maintained at all times.

Another object of the invention is to provide the air flow control system mentioned in the three preceding paragraphs with selectively operated means for rendering the servo-metering valve nonresponsive to the pressure differential between the throat and outlet of the Venturi section of the main duct and cause it to apply fluid at a predetermined reference pressure to the actuator for the valve means to dispose the valve means in position to admit air from the sources at a pressure and volume sufficient to perform a specific operation, such as starting an engine, the system being provided with a branch leading to a pneumatic engine starter for this purpose.

Still another object is to provide the system with emergency shutoff means including a fluid pressure responsive valve and electroresponsive means for effecting the operation of the valve upon the occurrence of unusual conditions, such as excessive pressures or temperature, in the system.

A more specific object of the invention is to provide flow control means for a system utilizing high- and low-pressure stages of the engine as sources of bleed air, and an ejector means for combining air from such sources in a most economical manner, the flow control means having a combination double sleeve modulating valve element which modulates, successively, both low-pressure stage and high-pressure stage inputs in response to signals from a mass flow computing means with servo control.

Other objects and advantages will be apparent from the following description of one form of the invention which has been illustrated in the accompanying drawings.

In the drawings:

FIG. 1 is a schematic view of a portion of a system embodying the present invention;

Figure 2:
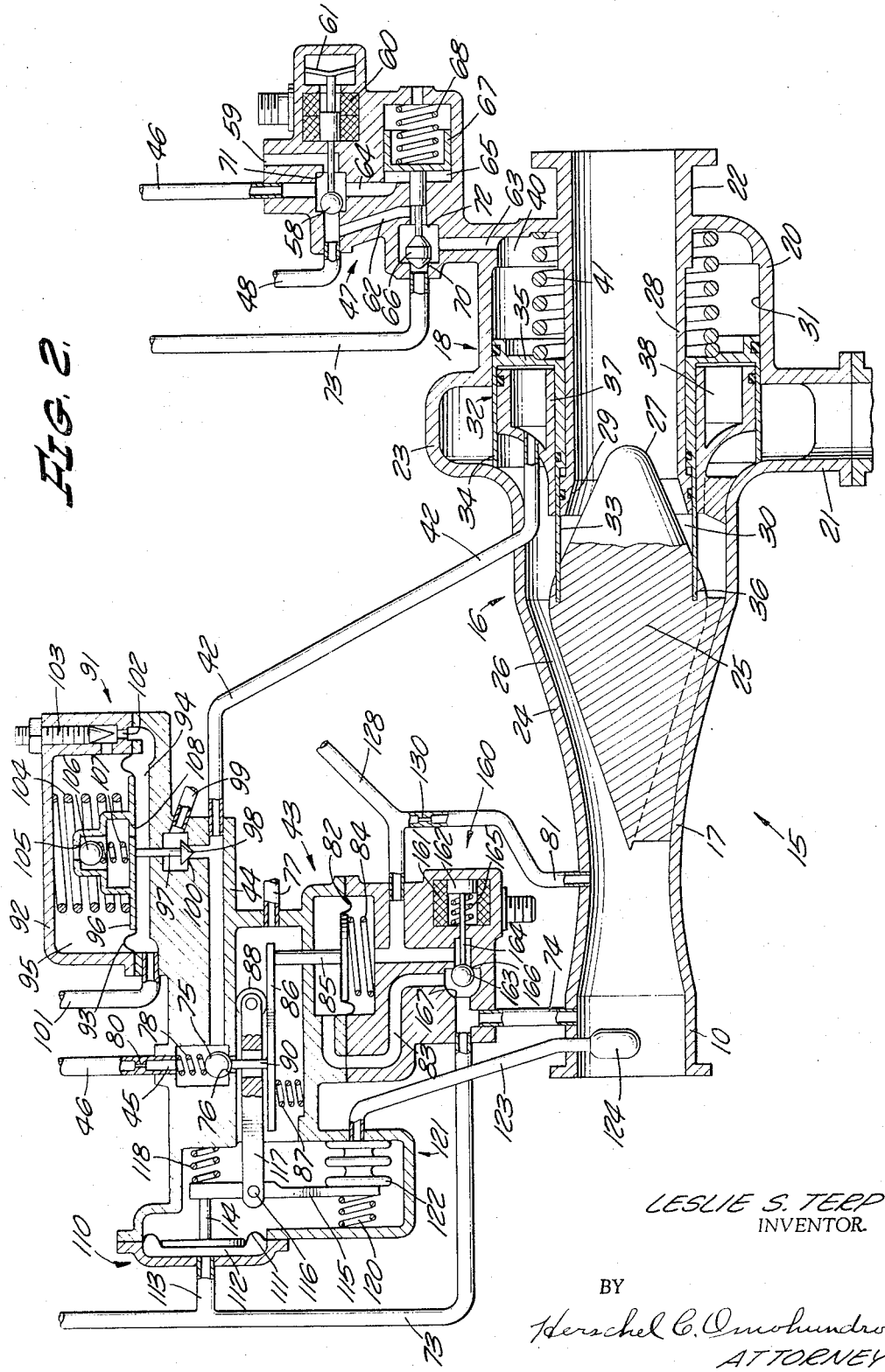
FIG. 2 is a detail sectional view of flow control mechanism forming a part of the system schematically illustrated in FIG. 1.

Referring more particularly to FIG. 1 of the drawing, it will be apparent that the system includes a main flow duct 10 having a pair of inlet branches 11 and 12, and an outlet branch 13 leading to an enclosure such as an aircraft cabin. Outlet branch 13 may lead directly to the cabin and may also be provided with a bypass portion in which air conditioning apparatus (not shown) is provided. A second outlet branch 14 may be provided to conduct air from the system to an engine starter (not shown). Branches 13 and 14 may be provided with selectively operated valve mechanisms (not shown) to direct air entirely to one branch or the other to perform the desired operations.

Inlet branches 11 and 12 lead, respectively, to the engine low- and high-pressure stage bleed ports. The system provided herein is intended for the purpose of conducting bleed air from the engine to the cabin for pressurizing and air conditioning the cabin, as pointed out in the objects.

Also pointed out as an object is the securing of the most economical and efficient use of bleed air from the engine. To accomplish this purpose, the control mechanism, designated generally by the numeral 15, has been provided. This control mechanism, as shown in FIG. 2, includes an ejector mechanism, designated generally by the numeral 16, and a Venturi section 17, both forming a part of the main duct 10.

In the present form of the invention a dual control valve mechanism 18 is provided in connection with the ejector mechanism for controlling the admission of air from the low- and high-pressure stages of the aircraft engine. The dual control valve is shown in detail in FIG.

2. Such valve includes a casing 20 having a pair of inlets 21 and 22, which are connected, respectively, with branches 11 and 12 leading in turn to the low- and high-pressure sources. Inlet 22 is disposed in axial alignment with the inlet end of the Venturi section 17 to eliminate as much as possible friction in the high-pressure line. Inlet 21 is arranged at right angles to the axis of the main passage and connects with an annular manifold 23 forming a part of the casing 20. This casing includes a converging section 24 which forms the inlet end of the Venturi 17. The casing is provided with a central body 25 in this converging section, the casing and central body forming an annular mixing passage 26. The central body has a frusto-conical end portion 27 extending in an upstream direction. Projecting into the casing is a tubular inner portion 28 which constitutes a continuation of the inlet 22. The tube 28 terminates adjacent the frusto-conical portion 27 in a flared end 29 which, together with the surface of the portion 27, provides an annular nozzle 30, the purpose of which will be made apparent in the following description.

Casing 20 is bored as at 31 to receive a combination valve and piston unit 32, which includes inner and outer sleeve valve portion 33 and 34, respectively, connected by a piston wall 35 mounted for sliding movement in the bore 31. The inner sleeve valve is adapted to extend into an annular slot 36 formed in the central body 25, the portion 33, when disposed in the slot, closing the nozzle 30 and preventing the admission of air from the high-pressure stage. Sleeve portion 34 engages the wall of the casing at one side of the manifold 23 to interrupt communication between such manifold and the main duct. When communication is obstructed in this manner, flow from the lower pressure source to the main duct will also be prevented.

The casing 20 has a portion 37 disposed between the tube 28 and the casing wall which serves to guide the sleeve valve portions and also provides a pressure receiving chamber 38 at one side of the piston wall 35. At the other side of the piston wall a second chamber 40 is formed in the casing 20, this chamber also receiving fluid pressure in the operation of the system. Chamber 40 has a spring 41 disposed therein, one end of the spring engaging the casing wall and the other engaging the piston to urge the combination valve and piston in a valve closing direction. Through the provision of the chambers 38 and 40, fluid under pressure may be applied to the piston in the operation of the system to effect opening and closing movements of the valves. Fluid may be introduced to chamber 38 through a tubular element 42 which leads thereto from a valve controlling mechanism, designated generally by the numeral 43. Pressure chamber 38 constitutes the valve opening pressure chamber, fluid supplied to this chamber tending to move the valve, in opposition to the spring 41, toward an open position.

Control mechanism 43 includes a casing 44 provided with a fluid pressure inlet 45 with which a passage 46 communicates, this passage leading to a master control valve mechanism, designated generally by the numeral 47. This mechanism in turn communicates through a passage 48 with a pressure regulator 50 (see FIG. 1), the latter being connected by a line 51 with the source of high pressure, such as branch 12 which leads to a high-pressure stage of the aircraft engine.

Regulator 50 is provided to reduce fluid pressure from the high-pressure source to a predetermined reference pressure. It includes a filter 52 for removing impurities from the air, and a pressure regulating valve 53 disposed for movement toward and away from a seat 54 under the influence of a spring 55 and pressure responsive bellows 56. These bellows are exposed on one side to fluid pressure at the downstream side of the valve 53 and at the other side to atmospheric pressure admitted through a port 57 in the wall of the regulator housing. Passage 48 leads from the downstream side of the valve 53.

It will be obvious from an inspection of the regulator shown in FIG. 1 that fluid under pressure supplied through line 51 will flow through the filter and past valve 53 to the interior of the regulator housing. The pressure of this fluid will be applied to the bellows 56, and when the pressure increases, the bellows will tend to move the valve 53 toward a closed position to maintain the pressure at a value predetermined by the force of spring 55 and the calculated area of the diaphragm. The fluid will flow from the regulator through line 48 to master control 47. As shown in FIG. 2, the master control includes a solenoid operated ON–OFF valve 58, the solenoid 60 for operating the valve being of the double-coil type with a latch or other means 61 to retain the valve in different positions of operation without requiring a constant application of current.

In FIG. 2 valve 58 is shown in an OFF position. In this position line 46 is connected with the ambient atmosphere through vent passage 59 and fluid pressure chamber 38 of the control valve 18 will then also be vented to the atmosphere. Also in the disclosed position of valve 58 the pressure line 48 will be connected by passages 62 and 63 with chamber 40 so that fluid under pressure from the regulator 50 will be applied to the side of the piston 35 engaged by the spring 41 to hold this piston in position to maintain sleeve valves 33 and 34 closed. When valve 58 is in the OFF position as shown in FIG. 2 another passage 64 will be connected with vent passage 59 and the piston chamber 65 of a selector valve 66 will be vented. At this time the piston 67 in this chamber will be resiliently held by a spring 68 in a position to cause the selector valve 66, connected with the piston, to engage seat 70. In this position of selector valve 66 the chamber 40 will be connected with the passage 48, and fluid under pressure will be supplied to chamber 40 to apply a closing force to the piston 35. Spring 41 will also tend to hold piston 35 in a valve closing position.

When solenoid 60 is energized to move valve 58 to an ON position, the valve will engage seat 71 surrounding the inner end of passage 59, and fluid pressure inlet line 48 will be directly connected with line 46. It will also be directly connected with passage 64 which leads to piston chamber 65. Fluid pressure thus supplied to chamber 65 will move piston 67 against the force of spring 68 to cause selector valve 66 to engage seat 72 and interrupt communication between passages 62 and 63. When valve 66 is disengaged from seat 70, communication will be established between passage 63 and a line 73 which communicates with another line 74 connected with the main duct 10 to sense static pressure at the outlet end of the Venturi section 17. With selector valve 66 engaged with seat 72 in the ON position, chamber 40 will be in communication with main duct 10 downstream of the flow controlling valves 18. When lines 48 and 46 are connected through the action of valve 58, as above described, fluid under pressure from the regulator 50 will flow to casing 44 and thence through line 42 to pressure chamber 38. This pressure fluid will apply a force to piston 35 to move it and sleeve valves 33 and 34 in an opening direction in opposition to the force of spring 41. To permit such movement of piston 35, fluid may flow from chamber 40 along the path outlined above, namely, passage 63 and lines 73 and 74 to the main duct 10. Movement of the combination valve and piston assembly 33, 34 and 35 by the pressure fluid is controlled, in part, by the mechanism 43

Mechanism 43 includes, as shown in FIG. 2, a servo-metering valve 75 disposed in casing 44 for cooperation with a seat 76 which communicates through the interior of the casing and a vent port 77 with the ambient atmosphere. Valve 75 is resiliently urged toward seat 76 by a spring 78. It will be noted that inlet port 45 is provided with a restriction 80 to limit the flow of fluid under pressure to the line 42 and chamber 38. If valve 75 is moved away from seat 76 a sufficient distance to allow more fluid to escape to the atmosphere than restriction 80 will admit to chamber 38, spring 41 and pressure in chamber 40 will move piston 35 in a valve closing direction. Assembly 43 includes means for moving valve 75 to govern the operation of the combination valve and piston assembly 33, 34 and 35 in accordance with the mass flow of air through the main duct 10. Such valve moving means has a mass flow computing means provided with a line 81 for sensing static pressure at the throat of Venturi 17 and applying such pressure to one side of a diaphragm 82 which is peripherally clamped between separable parts of casing 44. The static pressure at the outlet end of the Venturi section sensed by line 74 is applied, through an internal passage 83 formed in the casing, to the other side of diaphragm 82. It is well known in the art that when fluid flows through a Venturi the static pressures at the throat and outlet will be different, the lower pressure being at the throat. It is also well known that changes in velocity through the Venturi will cause variations in such pressure differential. These variations in pressure differential are utilized to actuate the servo-metering valve 75. The lower pressure of the pressure differential is applied to the underside of diaphragm 82 in this instance. A spring 84 is also arranged to apply a force to this side of the diaphragm to oppose the force of the higher pressure of the pressure differential which is applied to the opposite or upper side of the diaphragm. It should be clear that the diaphragm will seek a position in which the forces on opposite sides thereof are balanced or in equalibrium, and when the pressure differential varies the diaphragm will move accordingly.

Movement of the diaphragm is transmitted by rod 85 to one end of a lever 86, the other end of which is engaged by a spring 87 that tends to move the respective end of the lever in an upward direction. Between the spring 87 and rod 85 and on the opposite side of the lever there is disposed a roller 88 which by being engaged with the casing serves as a fulcrum for the lever 86. Between the spring 87 and the fulcrum roller 88 the lever is equipped with a push rod 90 which extends through the seat 76 and engages valve 75.

From the foregoing it will be apparent that movement of diaphragm 82 in response to variations in the sensed pressure differential will cause rocking movement of lever 86 about fulcrum 88, and push rod 90 will transmit corresponding movement to valve 75 to regulate bleed flow from the supply to chamber 38 through line 42. If air flow through the Venturi section changes in a manner to decrease the pressure differential between the throat and outlet, spring 84 will cause the diaphragm to move in an upward direction, making lever 86 swing in a counterclockwise motion about fulcrum 88. This action will permit ball 75 to move toward seat 76 and reduce bleed flow from supply for chamber 38. Pressure will then increase in the chamber and cause piston 35 to move sleeve valves 33 and 34 in an opening direction. As will be apparent, the slot 36 is of such depth that the assembly can move almost far enough to completely open valve 34 before valve 33 opens. Thus, air from the lower stage will be admitted first, and as the lower stage pressure decreases, piston 35 will be moved further in a valve opening direction until air from the higher pressure stage will be admitted. It should be recognized that if the pressure differential between the throat and outlet of the Venturi increases, the opposite effect will take place. The higher pressure above diaphragm 82 will depress the diaphragm, permitting spring 87 to rock lever 86 in a clockwise direction about fulcrum 88, and push rod 90 will move valve 75 away from seat 76 to bleed more pressure fluid from chamber 38. Spring 41 and pressure in chamber 40 can then move piston 35 in a direction to close valves 33 and 34. In this manner, flow control valves 33 and 34 will be positioned in accordance with the mass flow through the main duct.

As pointed out in the objects, greatest efficiency is obtained by using air from the lower pressure stage during as much of the mission as possible. There are periods, however, during certain phases of engine operation when the pressure in the lower stage may be partially or totally inadequate to meet the requirements. At these times, use is made of air from a higher pressure stage to supplement the air from the lower stage. The ejector makes it possible to use the lower stage more extensively by inducing a flow from the lower stage when it is only partially inadequate. When the lower stage becomes totally inadequate, the higher pressure stage will be used for the entire supply. When the pressure in the lower stage falls enough to cause the piston 35 to start to open valve 33, air from the higher pressure stage will be admitted to the inlet of the Venturi section through nozzle 30. Due to the high pressure of this source, air will flow rapidly into the Venturi entrance, causing an ejector action with consequent reduction in pressure around the outer side of the sleeve 33. This reduced pressure in turn causes a flow of air into the main duct from the manifold 23 and the lower pressure stage. The use of air from the latter stage is thus increased.

Sometimes during engine operation there might be a tendency for rapid pressure changes to take place at the bleed stages which if not counteracted could cause rough pressure changes in the aircraft cabin. To compensate or counteract these changes, means 91 are provided to govern the rate of response of the piston 35. Such rate control means 91 includes a chamber forming cover 92 by which a diaphragm 93 is held at its periphery to divide the chamber into sections 94 and 95. The diaphragm has a center plate 96 from which a push rod 97 extends to a poppet valve 98 arranged for cooperation with a seat 100 to controllably bleed pressure fluid to the atmosphere from passage 42 through vent 99. Chamber section 94 is connected by line 101 with the main duct 10 at a location downstream of the control mechanism 15. As shown in FIG. 2, chamber section 94 is also connected with chamber section 95 by a passage 102 which may be variably restricted through the adjustment of a valve screw 103. A spring 104 is arranged in chamber section 95 between the center plate 96 and cover 92 to urge diaphragm 93 and valve 98 toward seat 100. Center plate 96 is provided, within chamber section 95, with a thimblelike element forming a seat 105 against which a check ball valve 106 is held by a spring 107. If a sudden increase in pressure at the source should occur, or if at the initiation of operation of the control system the pressure in main duct 10 should start to rise too rapidly, this increase in pressure would be transmitted through line 101 to chamber 94 and be applied to the underside of diaphragm 93. Since flow through passage 102 is restricted, pressure above the diaphragm cannot increase as quickly and the diaphragm will be elevated to open valve 98 and bleed some of the opening pressure from line 42 and chamber 38. Opening movement of piston 35 will thus be retarded. As the fluid flows through the restricted passage 102, pressures on opposite sides of diaphragm 93 will be equalized and spring 104 will move valve 98 to a closed position. If the pressure in the main duct should suddenly decrease immediately following an increase, as above described, diaphragm 93 will be quickly repositioned for a subsequent operation by flow of equalizing pressure from chamber section 95, through seat 105, past valve 106, and through opening 108 in the center plate and diaphragm.

At times, during the operation of the air flow system, it is necessary to pass some of the air flowing to the cabin through refrigeration or cooling apparatus (not shown). This phase of operation may, by the introduction of resistance, cause an undesirable increase of pressure in main duct 10. Means 110 has been provided to compensate for such pressure increase and to insure the same mass flow at all times. Means 110 includes a diaphragm 111 clamped in casing 44 to provide a pressure chamber 112 communicating through tube 113 and lines 73, 74 with the main duct 10. A pressure increase in the main duct 10 will be applied through tube 113 to diaphragm 111, causing it to move toward the right, as viewed in FIG. 2, and transmit similar movement through plunger 114 to one end of a lever 115 which is pivotally connected intermediate its ends, as at 116, to one end of a link 117. This link carries at its opposite end the fulcrum roller 88. Lever 115 is engaged on the side opposite plunger 114 by a coil spring 118, and at the end on the other side of pivot 116, but on the same side as the plunger with another coil spring 120. Springs 118 and 120 engage the casting and yieldably resist movement of lever 115 by diaphragm 111. Diaphragm movement transmits movement at reduced ratio through link 117 to roller 88 to change the fulcrum point of lever 86. The degree of opening movement of servo-metering valve 75 will thus be adjusted to compensate for pressure change in duct 10.

Temperatures changes in the air in duct 10 which might affect mass flow are also compensated for in a somewhat similar manner by means 121, which includes a bellows 122 attached at one end to the wall of the casing 44, and at the opposite end to the end of lever 115 engaged by spring 120. The interior of bellows 122 communicates via a tube 123 with a bulb 124 supported in duct 10. The bulb 124, tube 123, and bellows 122 are filled with a thermal fluid which expands and contracts in response to temperature changes. Expansion and contraction of bellows 122 imparts to fulcrum roller 88 a similar but opposite effect as that of diaphragm 111. For example, an increase in pressure sensed by diaphragm 111 causes roller 88 to move to the right, as viewed in FIG. 2, while an increase in temperature sensed by bulb 124 and bellows 122 causes roller 88 to move to the left, as viewed in FIG. 2. It will be obvious that changes in pressure and temperature as thus compensated for by the mechanism just described.

To insure the safe operation of the air flow control system, some safety mechanisms have been provided. One such mechanism is a high limit thermostat 125 also disposed in the main duct 10 downstream of the control mechanism. This thermostat has a thermal element 126 projecting into the duct and a bleed valve 127 outside of the duct immediately adjacent the element. Valve 127 is connected by line 128 with throat static pressure sensing tube 81. Adjacent the point of connection of line 128 and tube 81 the latter is provided with a restriction 130. An inspection of FIGS. 1 and 2 will show that in the event the temperature of the air in the main duct should increase beyond a predetermined maximum, element 126 will cause valve 127 to establish communication between line 128 and the atmosphere through vent 131. Fluid pressure at the underside of diaphragm 82 may then bleed to the atmosphere through line 128 and vent 131. Pressure above the diaphragm may then depress the diaphragm, permitting spring 87 to rock lever 86 around fulcrum 88 in a clockwise direction. This movement will increase the opening of valve 75 and fluid pressure can bleed from chamber 38 to permit valve closing movement of piston 35. The flow of air from the engine, which is the source of heat, will then be reduced.

Figure 3:
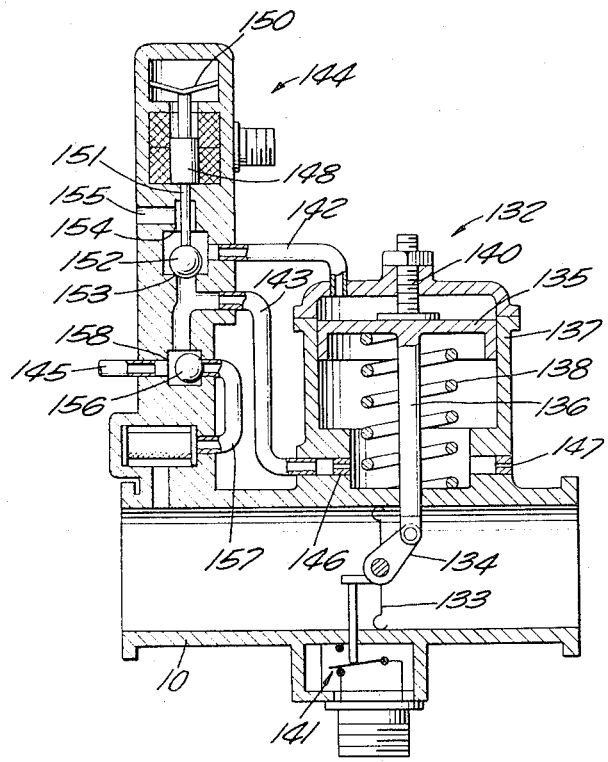
FIG. 3 is a similar view of an emergency shutoff valve mechanism used in the system of FIG. 1.

Another safety mechanism provided in the system is the emergency shutoff valve indicated generally at 132. This valve, as shown in detail in FIG. 3, has a butterfly type of closure 133 pivotally supported in the main duct 10. A lever 134 transmits motion to the butterfly from a piston 135 and rod 136. Piston 135 is mounted for movement in cylinder 137 under the influence of a spring 138 and fluid pressures supplied to the cylinder at opposite sides of the piston. Spring 138 normally tends to maintain valve 133 in a closed position, movement in this direction being limited by stop screw 140. A switch 141 at the exterior of the duct adjacent the valve shows the operative condition thereof. The portions of cylinder 137 at opposite sides of the piston communicate by tubes 142 and 143 with a solenoid actuated ON-OFF pilot valve 144. In the drawing, valve 133 is shown in a closed condition.

When fluid pressure is supplied through the initial starting of the engine, it will flow through line 51, regulator 50, lines 48 and 145, to pilot valve 144. Since this valve is then in an OFF condition, fluid pressure will flow through tube 143 to the cylinder 137 at the lower side of piston 135, the force of this pressure fluid tending to move the piston in a valve closing direction. Flow into the cylinder is restricted as at 146 and a bleed to the atmosphere is provided at the restricted vent 147. Valve 144 has a double-coil field to move the armature 148 in both directions and a latch mechanism 150 to retain it in each position so that current flow can be discontinued after the valve has been actuated. The armature is connected by a stem 151 with the ball 152 to move the same from one seat 153 to the other 154. When the ball is engaged with seat 153, as shown, tube 142 is vented through port 155 to the atmosphere and the space above piston 135 will likewise be vented. Valve 144 also contains a check valve 156 which is movable in response to fluid pressure from the position shown, in which it prevents fluid pressure supplied through line 145 from flowing through tube 157 to the duct 10 to a position in engagement with seat 158 wherein fluid pressure from duct 10 can flow through tube 157 to the space under piston 135.

When the solenoid valve 144 is energized to place it in the ON or open-valve position, ball 152 will be engaged with seat 154, and line 145 will communicate with lines 142 and 143. Since the chamber beneath piston 135 is vented through the restriction 147, pressure applied through line 142 to the upper side of piston 135 will move valve 133 to an open position. Any desired switch means, either pressure or temperature operated, may be utilized to control current flow to the solenoid of valve 144 to effect its operation. When the OFF or closed-position coil is energized, valve 152 will be moved to the position shown and the space above piston 135 will be vented. Fluid supply line 145 will then be connected only with the space below piston 135 through tube 143 and fluid pressure will move piston 135 to a valve closing position. Any fluid pressure remaining in duct 10 after the supply source has been disconnected may escape through tubes 157, 143 and restrictions 146, 147.

As mentioned in the objects, it may be desirable to use main duct 10 to supply air to a pneumatically operated engine starter. To this end duct 10 has been provided with branch outlet 14 leading to the starter. When the system is used for this purpose, it is not necessary to have the control mechanism 15 govern valve operation in accordance with mass flow of air through the duct. All that is necessary is to provide for flow at a predetermined regulated pressure. To secure this type of operation, means 160 (see FIG. 2) has been provided to render the mass flow computing means insensitive to mass flow. Means 160 includes a solenoid operated valve with a single field coil 161, an armature 162, a ball valve 163 connected with the armature 162 by a stem 164, and a coil spring 165. The ball valve 163 is normally held, when the field coil is de-energized, in engagement with seat 166 by the force of spring 165. In this condition of valve 160 the system operates as previously described.

When coil 161 is energized, the armature 162 will move ball 163 into engagement with seat 167 to cut off Venturi outlet static pressure from diaphragm 82 and admit Venturi throat static pressure through passages 81 and 83 to both sides of diaphragm 82. With pressure equalized on both sides, diaphragm 82 will be moved by spring 84 to cause lever 86 to rock in a counter-clockwise direction and permit servo-metering valve 75 to close. Full regulator pressure will then be directed from line 46 through line 42 to chamber 38, and piston 35 will be moved in a valve opening direction. With ball 163 engaged with seat 167, lines 74, 73 and passage 63 will connect chamber 40 with the main duct at the outlet end of the Venturi section and downstream of the valve 18. Piston 35 will thus be exposed on the opening force side to fluid pressure determined by the regulator 50, and on the closing force side by the force of spring 41 and fluid pressure downstream of the valve which will be determined by the degree of opening of the valve. The pressure of the air delivered to the starter will then be determined by the rate of spring 41 and the setting of regulator 50.

I claim:

1. A system for controlling air flow from a plurality of sources at different pressures to an enclosure, comprising:
   (a) a main duct with a plurality of inlets, each communicating with a different source, and an outlet communicating with the enclosure, said main duct having a Venturi section;
   (b) ejector means within said main duct adjacent said plurality of inlets, said ejector means being constructed and serving to utilize air from a higher pressure source to augment air flow from a lower pressure source; and
   (c) valve means adjacent said ejector means for controlling the flow from all sources to said main duct, said valve means having a single actuator responsive in part to pressure conditions at the Venturi section for performing all functions.

2. The air flow control system of claim 1 in which means are provided to control the operation of the actuator for the valve means in accordance with variations in the pressured differential between the throat and the outlet of the Venturi section.

3. The air flow control system of claim 1 in which the actuator for the valve means is of the fluid pressure responsive type and means are provided to compute the mass flow through the Venturi section and control the application of fluid pressure to the actuator of the valve means in accordance with variations in such mass flow.

4. The air flow control system of claim 3 in which said computing and controlling means is provided with means responsive to variations in pressure of the air at the outlet end of the Venturi section to adjust the controlling portion of said means and vary the operation of the actuator of the valve means to compensate for such variations in pressure.

5. The air flow control system of claim 3 in which said computing and controlling means is provided with means responsive to variations in temperature of the air at the outlet end of the Venturi section to adjust the controlling portion of said means and vary the operation of the actuator of the valve means to compensate for such variations in temperature.

6. The air flow control system of claim 3 in which said computing and controlling means is provided with means responsive to variations in both pressure and temperature of the air at the outlet end of the Venturi section to adjust the controlling portion of said means and vary the operation of the actuator of the valve means to compensate for such variations in pressure and temperature.

7. The air flow control system of claim 3 in which means are provided to control the rate of response of the actuator of the valve means to the operation of the controlling portion of said computing and controlling means.

8. The air flow control system of claim 3 in which the mass flow computing means includes means for sensing the pressure differential between the throat and outlet of the Venturi and the controlling portion includes a servo valve operated in accordance with variations in such pressure differential, and means are provided to selectively render the mass flow computing means insensitive to mass flow and cause said controlling portion to effect a predetermined operation of the actuator of said valve means.

9. The air flow control system of claim 1 in which the valve means has first and second parts connected to move as a unit, one of said parts controlling the admission of air from the lower pressure source and the other of said parts controlling the admission of air from the higher pressure source.

10. The air flow control system of claim 9 in which the valve means is constructed to prevent the admission of air from the higher pressure source until the part controlling the admission of air from the lower pressure source has been moved to a substantially fully open position.

11. The air flow control system of claim 9 in which means are provided to normally urge said first and second valve parts toward positions to prevent the admission of air from any of the pressure sources, and means for utilizing fluid pressure from a suitable source to move said first and second valve parts toward valve opening positions.

12. The air flow control system of claim 3 in which the pressure application controlling portion of said means constitutes a servo-metering valve with means normally disposing it in position to apply fluid pressure from a suitable source to said actuator to move the valve means toward open position when no pressure differential exists between the throat and outlet of said Venturi section.

13. The air flow control system of claim 12 in which means are provided to selectively dispose said servo-metering valve in position to apply fluid from the source to said actuator to move the valve means toward open position irrespective of the existence of a pressure differential between the throat and outlet of said Venturi section.

14. The air flow control system of claim 9 in which means are provided to apply pressure from a suitable source to said valve actuator to move said valve parts toward open position and to apply fluid pressure from said main duct downstream of said Venturi section to said actuator to oppose such movement, and resilient means are provided to apply a valve closing force to said actuator.

References Cited

UNITED STATES PATENTS

| | | | |
|---|---|---|---|
| 2,723,615 | 11/1955 | Morris | 98—1.5 |
| 2,734,356 | 2/1956 | Kleinhans | 98—1.5 XR |
| 3,192,848 | 7/1965 | Townsend | 98—1.5 |

MEYER PERLIN, *Primary Examiner.*